US007920463B2

(12) United States Patent
Charzinski et al.

(10) Patent No.: US 7,920,463 B2
(45) Date of Patent: Apr. 5, 2011

(54) METHOD AND NETWORK CONTROL UNIT FOR DEACTIVATING A NETWORK COMPONENT

(75) Inventors: Joachim Charzinski, Munich (DE); Uwe Walter, Weingarten (DE)

(73) Assignee: Nokia Siemens Networks GmbH, Munich (DE)

( * ) Notice: Subject to any disclaimer, the term of this patent is extended or adjusted under 35 U.S.C. 154(b) by 0 days.

(21) Appl. No.: 12/294,358

(22) PCT Filed: Mar. 20, 2007

(86) PCT No.: PCT/EP2007/052600
§ 371 (c)(1),
(2), (4) Date: Oct. 28, 2009

(87) PCT Pub. No.: WO2007/110346
PCT Pub. Date: Oct. 4, 2007

(65) Prior Publication Data
US 2010/0034080 A1 Feb. 11, 2010

(30) Foreign Application Priority Data
Mar. 27, 2006 (DE) .......................... 10 2006 014 378

(51) Int. Cl.
*H04J 3/14* (2006.01)
*G06F 11/00* (2006.01)
(52) U.S. Cl. ......... 370/216; 370/229; 370/241; 370/252
(58) Field of Classification Search ........................ None
See application file for complete search history.

(56) References Cited

U.S. PATENT DOCUMENTS

| 6,765,863 B1 * | 7/2004 | Wakimoto et al. ............ 370/218 |
| 6,985,476 B1 * | 1/2006 | Elliott et al. .................. 370/349 |
| 6,999,459 B1 * | 2/2006 | Callon et al. .................. 370/400 |

(Continued)

FOREIGN PATENT DOCUMENTS
EP    0889656 A    1/1999

(Continued)

OTHER PUBLICATIONS

Wang, Xin et al.; "An Integrated Resource Negotiation, Pricing, and QoS Adaptation Framework for Multimedia Applications"; IEEE, vol. 18, No. 12, Dec. 2000.

(Continued)

*Primary Examiner* — Chi H Pham
*Assistant Examiner* — Soon-Dong D Hyun
(74) *Attorney, Agent, or Firm* — Laurence A. Greenberg; Werner H. Stemer; Ralph E. Locher

(57) ABSTRACT

The invention relates to a method and to a network control unit for deactivating a network component for example, one or several connections or an entire network node, the method being used to carry out deactivation in simple manner without impairing the traffic and optionally, the reliability. The invention also relates to a method for deactivating a network component, in particular one or several connections and/or a network node in a communication network including a plurality of network components. The method includes: a) the network components which are to be deactivated are identified; b) a new metric set (M1) for the remaining network components is calculated c) the new metric set is configured in the network and the network is rerouted; and d) the network components which are to be deactivated are removed.

9 Claims, 2 Drawing Sheets

U.S. PATENT DOCUMENTS

| | | | |
|---|---|---|---|
| 7,355,986 B2 * | 4/2008 | Vanderveen et al. | 370/255 |
| 2003/0161275 A1 * | 8/2003 | Malhotra et al. | 370/256 |
| 2004/0120706 A1 * | 6/2004 | Johnson et al. | 398/10 |
| 2005/0195835 A1 * | 9/2005 | Savage et al. | 370/401 |
| 2006/0050634 A1 | 3/2006 | Gous | |
| 2007/0189316 A1 * | 8/2007 | Qing et al. | 370/412 |

FOREIGN PATENT DOCUMENTS

| | | |
|---|---|---|
| EP | 1 638 254 A1 | 3/2006 |
| WO | WO 96/41451 A | 12/1996 |
| WO | WO 02/06918 A | 1/2002 |

OTHER PUBLICATIONS

Menth, M. et al.; "A performance evaluation framework for network admission control methods"; Network Operations and Management Symposium, 2004; NOMS 2004; IEEE/IFIP; Seoul, Korea, Apr. 19-23, 2004, Piscataway, New Jersey. USA, IEEE; XP010712590 (Abstract).

Menth, M. et al.; "A performance evaluation framework for network admission control methods", University of Wurzburg Institute of Computer Science Research Report Series, Report No. 305, Feb. 2003.

* cited by examiner

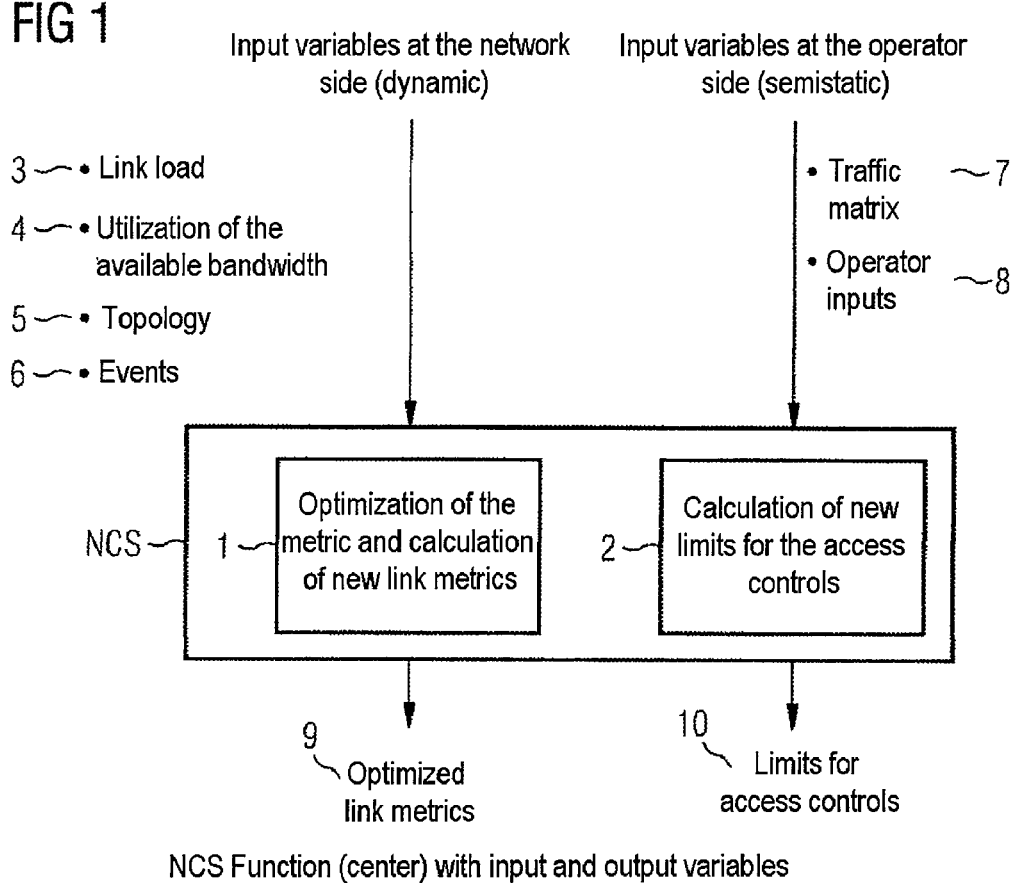
NCS Function (center) with input and output variables
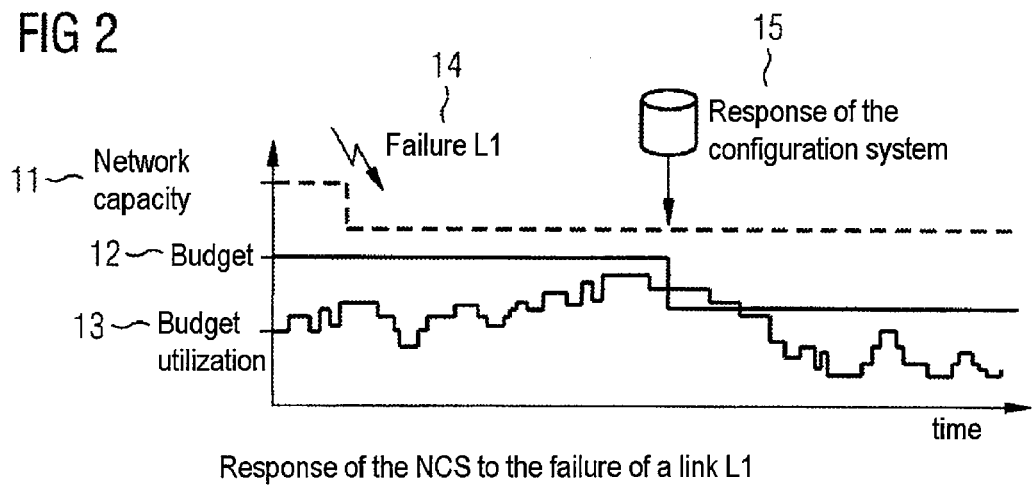
Response of the NCS to the failure of a link L1

METHOD AND NETWORK CONTROL UNIT FOR DEACTIVATING A NETWORK COMPONENT

CLAIM FOR PRIORITY

This application is a national stage application of PCT/EP2007/052600, filed Mar. 20, 2007, which claims the benefit of priority to German Application No. 10 2006 014 378.7, filed Mar. 27, 2006 the contents of which hereby incorporated by reference.

TECHNICAL FIELD OF THE INVENTION

The invention relates to a method and network control unit for deactivating a network component, particularly one or more connections and/or a network node, in a communication network having a number of network components.

BACKGROUND OF THE INVENTION

One of the currently most important developments in the field of networks is the evolution of data networks for the transmission of real-time traffic, i.e. voice, video information and audio information. To render a data network capable of real time operation, mechanisms must be provided which ensure that so-called quality-of-service features such as, e.g. the transmission duration, the so-called jitter and the packet loss rate are maintained. In a real-time-capable network, it must be prevented that situations occur in which committed quality-of-service features can no longer be guaranteed.

Conventional data networks have the handicap that overload situations can occur which can lead to long packet delays or even packet losses. For this reason, real-time-capable data networks or packet networks—conventional data networks are based on the transmission of IP packets such as, e.g. the Internet, as a rule—work with traffic restriction at least for real-time traffic and prioritization of the real-time traffic in order to be able to provide the required quality of service for the real-time traffic. Traffic restriction is in most cases based on access controls in the course of which traffic to be transmitted is registered and allowed or rejected depending on the available bandwidth. When access controls are set up, a service-compatible quality of service should be guaranteed, on the one hand, and on the other hand, the network operator is interested in transmitting as much traffic as possible in order to achieve the highest possible revenue. When limits are chosen, a compromise must be found, therefore, which allows the transmission of as much traffic as possible without this impairing the quality of service.

In data networks, the operator additionally has the capability of optimizing the transmission or distribution of traffic in his network by specifying so-called metric sets. A metric set is here intended to mean the totality of all "interface cost" parameters configured in the network elements (routers) of the network. Specifying limits for the access control and metric sets presents a considerable expenditure in larger networks. If it is additionally intended for parameters to be predeterminable at the operator side in order to be able to, for example, conform to economic agreements and if the adjustments are intended to be correctable in the case of changed traffic conditions, the operator is confronted with configuring of considerable effort and considerable complexity.

In IP networks, the routing tables are then determined in the routers with the aid of distributed or replicated routing algorithms. The length of the various possible paths to a destination is determined as the sum of the link or interface cost metrics on the paths. The next node of the shortest path is finally entered as "next hop" in the routing table for the corresponding destination. If several equally long shortest paths are determined, the equal cost multiple path (ECMP) option of OSPF can also be used for determining that all corresponding next hop routers are included in the routing table.

To divert the traffic from links with high traffic utilization to less severely loaded links, it has been variously proposed to select all link or interface cost metrics in the network not to be all equal but to adjust them in accordance with the result of a multidimensional optimization

[B. Fortz, M. Thorup, "Internet Traffic Engineering by Optimizing OSPF Weights", Proc. IEEE Infocom 2000, http://www.ieee-infocom.org/2000/papers/utilization65.ps]. However, this does not guarantee that these optimized metrics will still lead to lower link utilization than the standard adjustment with homogenous metrics on all links even in the case of errors such as e.g. a link failure or a router failure.

As a rule, cost metrics are all set to the same value or to the inverse of the bandwidth in a network or are optimized for the good case (without link failures). In [A. Nucci et al. "IGP Link Weight Assignment for Transient Link Failures". Proceedings of ITC 2003, Berlin, Germany, September 2003, pp. 321-330] an optimization taking into consideration link failures for a taboo search method for single-path routing is described. With the aid of these cost metrics, the routing protocols determine shortest routing paths between input and output network nodes in the sense of the routing paths with the least cost sum of the connecting paths. If there are several equally good routing paths or routing path sections, i.e. part-sections of the routing path, the data packet traffic or the data packets are distributed over several equally good paths, for example with the aid of the equal cost multipath method (ECMP) for short.

If then an operator of an IP network wishes to (temporarily) deactivate a network element, i.e. for example one or more lines or else an entire node, from his network, he must ensure that no further traffic is handled via this network element if he does not wish to avoid the loss of data packets and thus connection faults. In this respect, he has basically several options:

a) Using an equivalent circuit on the physical layer (layer 1) he can shut down, for example, a line in the field of long distance lines, and another
line takes over its traffic. This procedure cannot be applied if the operator wishes to shut down the complete line from one router to another router or if he wishes to exchange an interface card in a router.

b) In most cases, the method is selected to simply switch off a connection and to leave it to the fault detection system to detect this and then to find a new path in the routing protocol. To avoid relatively large impairments of traffic, this procedure is therefore selected, as a rule, in low-traffic times, that is to say normally during the night.

c) To avoid the disadvantage of option b), namely the sometimes very long time interval until the artificially generated failure is detected, the respective IP interfaces can be deactivated with "interface down" in the two routers affected. This saves the time for error detection and rerouting can start immediately.

d) An alternative to option c) can also consist in setting the cost metrics (interface cost metric) for the connection affected so high at both ends that the connection is no longer used for traffic after a subsequent rerouting. After that, the connection can be taken out of operation without requiring further rerouting.

In all the abovementioned cases, the network operator lacks a robust statement about the extent of the impairment of the traffic and the capability of optimizing the routing in the network towards the new situation. In addition, to operate the network case by case with admission control budgets for securing QoS attributes, the authorization boundaries (budgets) are no longer correct after the deactivation of network components. Should it already have been a matter of admission control with a fault tolerance, no traffic is impaired after the deactivation of a connection but the new fault tolerance must only be established again by corresponding adaptations of the admission control budget in response to the deactivation.

SUMMARY OF THE INVENTION

The present invention relates to a method and a network control unit for deactivating a network component, for example, one or more connections or an entire network node by means of which the deactivation can be performed in a simple manner without the traffic and possibly the fault tolerance being impaired.

In one embodiment of the invention, there is a method for deactivating a network component, particularly one or more connections and/or a network node, in a communication network having a number of network components is provided which comprises:

a) identifying the network component to be deactivated;

b) calculating a new metric set for the remaining network components and optionally calculating new admission control budgets for the network on the basis of the new metric set;

c) optionally determining a traffic characteristic to be expected for the network with this new metric set and/or these new admission control budgets;

d) optionally comparing the traffic characteristic to be expected with a predetermined limit value;

e) optionally obtaining an explicit confirmation via the network operator for the next two steps when the limit value is exceeded;

f) configuring the new metric set in the network and rerouting the network; and g) removing the network component to be deactivated.

With respect to the network control unit initially mentioned, there is a network control unit for deactivating a network component, particularly one or more connections and/or a network node, is provided in a communication network having a number of network components, comprising:

a) an identifying device for identifying the network component to be deactivated;

b) a calculating for calculating a new metric set for the remaining network components and optionally for calculating new admission control budgets for the network on the basis of the new metric set;

c) an optional determination device for determining a traffic characteristic to be expected for the network with this new metric set and/or these new admission control budgets;

d) an optional comparing device for comparing the traffic characteristic to be expected with a predetermined limit value;

e) an optional communicating device for communicating with the network operator when the limit value is exceeded;

f) a configuring device for configuring the new metric set in the network and for rerouting the network; and g) a removing device for removing the network component to be deactivated.

In this manner, the network operator obtains a robust statement about a possible extent of the impairment of the traffic and can thus optimize the routing in the network towards the new situation. For operating the network case by case with admission control budgets for securing QoS attributes, the authorization limits (budgets) are thus completely correct after the deactivation of network components. If it should already have been a matter of an admission control with a fault tolerance, the fault tolerance required for a QoS network is thus re-established after the deactivation of a connection.

Deactivation of a network component can be implemented in a particularly simple manner, having regard to the severity of the intervention in the control, in that the new metric set is supplemented with a metric value for the network component to be deactivated, which handicaps this network component to be deactivated with respect to the remaining network components. For example, this makes the network component to be deactivated so expensive in price that it is no longer used in the routing of the traffic. Thus, for example, the maximum permissible metric value can be used as a very high metric value.

For the determination of criteria for the feasibility/permissibility of the planned deactivation which can be assessed in a particularly clear manner, in particular, a failure probability to be expected and/or a blocking to be expected and/or a mean link utilization to be expected can be determined as traffic characteristic. Instead of a comparison with threshold values for a blocking, a direct access to corresponding raw data can also be provided by the network control unit.

A further embodiment in accordance with the new metric set and/or the new admission control budgets, reservations for transmission capacity are authorized when a sum of the reservations has decayed to a value below a corresponding value in the new metric set and/or in the new admission control budgets. If thus, for example, a budget is smaller than the sum of the traffic permitted on the corresponding transmission link, no new reservations are allowed until sufficient reservations have terminated themselves virtually independently.

If several network components are intended for deactivation, two procedures are available in appropriate development of the invention which can also be used in combination.

On the one hand, in the deactivation of several network components, the method steps a) to f) can be serially processed for one network component after the other. On the other hand, however, in the deactivation of several network components, these network elements or at least a subset including several network components can be accumulated to form a virtual network element.

Should it come to a loss of connectivity with individual network nodes after the actual deactivation of network connections, the network control unit can be arranged in such a manner that it issues a warning to the operator. An attempt at such connectivity cannot be detected by a calculation of the usual admission control budgets and blockings on the basis of the new metric set alone because, for example, a connection will nevertheless still be used if there is no alternative connection even with a maximum metric value. The checking of the network for a loss of connectivity between two network components due to the planned deactivation of the network component connecting the two network components can therefore be carried out by means of a virtual network graph which does not contain the network component to be deactivated.

BRIEF DESCRIPTION OF THE INVENTION

Preferred exemplary embodiments of the present invention will be explained in greater detail with reference to a drawing. In this context, the term budget is used for the bandwidth for the transport of traffic existing due to the determination of boundaries for the access controls. In the drawing:

FIG. 1 shows a network control unit according to the invention with input and output variables.

FIG. 2 shows a representation of a response to the uncontrolled failure of a link.

DETAILED DESCRIPTION OF THE INVENTION

Figure 3:
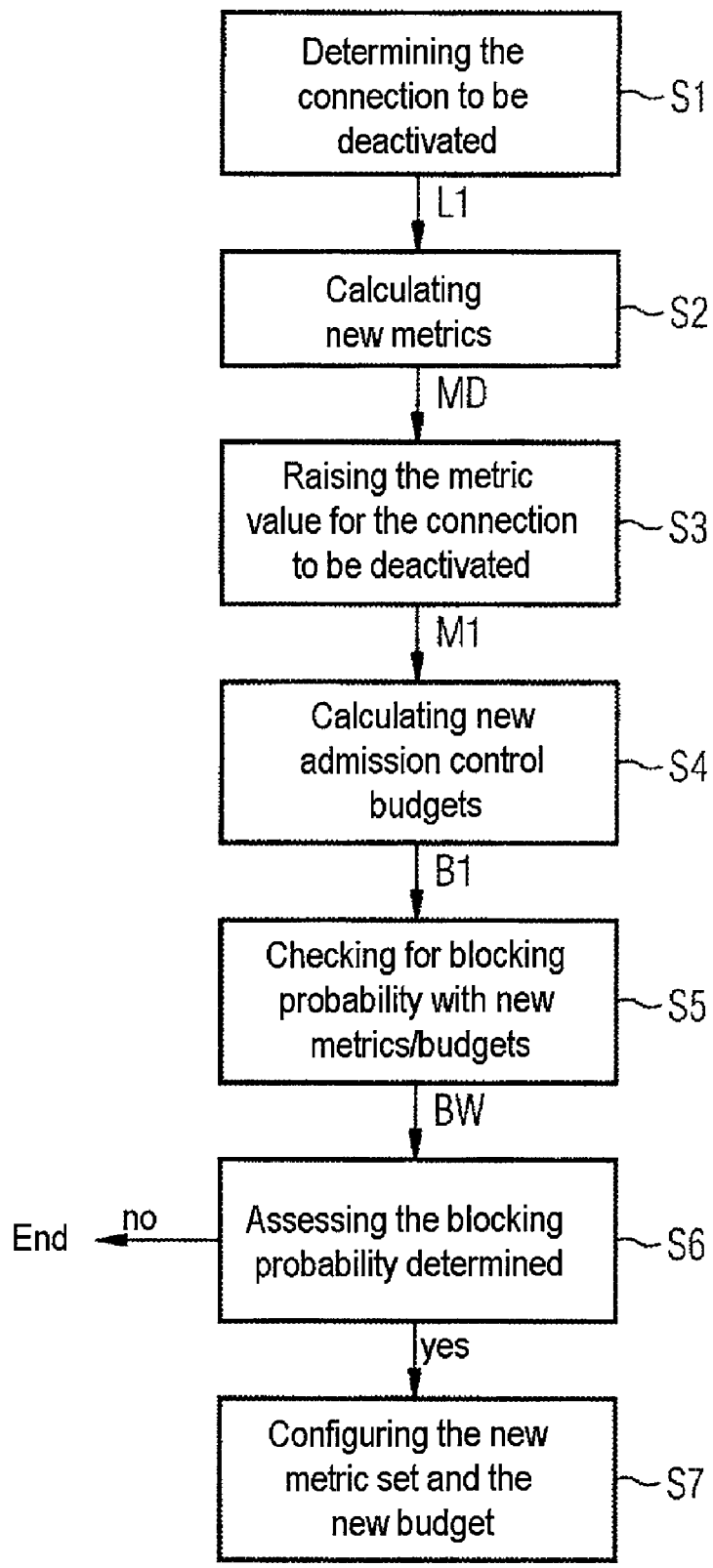
FIG. 3 shows a flowchart of the method according to the invention for the planned deactivation of a connection.

FIG. 1 diagrammatically shows a network control unit NCS according to the invention. In this network control unit NCS, modules for the following functions are arranged:

1: Optimization of the metric and calculation of new link weights (link metric optimization).

2: Calculation of new limits for the access controls (NAC budget computation).

On the network side, input variables of the system are the load of the links (link load) 3, the utilization of the available bandwidth or, respectively, the bandwidths still available at the individual limits (budget usage) 4, the topology of the network 5 and events 6 such as e.g. network failures which can lead to a recalculation of limits. On the side of the operator, it is possible to predetermine a traffic matrix 7. However, it is also conceivable to determine a traffic matrix by automated measurements at regular intervals and to forward it to the network control unit NCS. In addition, the operator can predetermine rules or boundary conditions (operator policies) 8 which are due to economic considerations, e.g. the prioritization of traffic of particular customers or additional prioritizations. The operator can thus, e.g., configure a threshold for the number of link failures in which the budgets are still to be calculated preventatively in such a manner that in the case of further failures, the QoS commitments (quality of service) or the quality of service committed to the authorized reservations are still adhered to. Naturally, any preventative reduction of the budget increases the frequency of blocking and thus reduces the revenue of the network operator whilst, on the other hand, it provides protection against violation of the QoS commitments.

The network control unit NCS supplies as output variables a new metric set in the form of optimized link metrics 9 and new admission control budgets in the form of limits (budgets with resilience) 10 for the access controls (NAC: network access control) which can be established in such a manner that redundant bandwidth for absorbing the failure is given for the failure of network elements.

To activate limits or budgets, a further protocol can be used in order to achieve a consistent budget adaptation. Initially, the budget changes only activate the budget reductions. The access control entities (NACs) inform the configuration system (e.g. Network Control Service, NCS) as soon as the reserved budget is in each case moving within the framework of the newly predetermined budget. When all NACs for all changed budgets have signaled to the NCS that the budgets are now adhered to, the NCS can increase the remaining budgets (to be increased).

During the network operation, link and budget utilizations and topology changes (failures, resumptions of operation, network expansions) and other events are observed and possibly new budgets and link cost metrics are calculated, if necessary. In the text which follows, the response to failures will be discussed in greater detail.

FIG. 2 diagrammatically shows the variation of the available network capacity 11 of the available budget 12 and the budget utilization with time 13. The budgets 12 are calculated in such a manner that the authorized traffic can be transported with the given QoS commitments or the committed quality of service, respectively, even after the failure 14 of an (arbitrary) link L1 in the network. If such a failure 14 then actually occurs (symbolized by the arrow in FIG. 2), nothing further needs to happen apart from the restoration of the availability in the network by rapid error detection and correspondingly rapid rerouting.

However, to be able to secure the provision of the quality of service (QoS) again in the case of further link failures, the configuration system (NCS: network control server) 15 will still adapt the budgets to the new topology now valid (NCS reaction) FIG. 2 shows that after this adaptation, more budget 12 can initially be reserved than actually exists. While this is the case, all new reservation requests are blocked in the budgets affected. Due to the natural fluctuation of the reservations, this transient or temporary state is left again after some time when sufficient reservations have been terminated. From this time on, the resource administration operates normally again and new reservations are authorized if they still fit into the budget affected in each case. With the reduced budget, the frequency of blocking, i.e. the average rate for rejections of reservation requests, is naturally slightly greater than before but this is a natural consequence of the lack of the failed network resources.

If a link that has failed once comes into operation again, the budgets can be correspondingly recalculated again and the new values can be configured again in the configuration system or the NAC components, respectively.

In spite of this very mature procedure for securing redundant bandwidth in the network, this does not provide for the handling of planned deactivations of, for example, link L1. As initially mentioned, the network operator lacks a robust statement about the extent of the impairment of the traffic and the capability of optimizing the routing in the network towards the new situation. To operate the network case by case with admission control budgets for securing QoS attributes, the authorization limits (budgets) also are no longer correct after the deactivation of network components. If it should already have been a matter of admission control with fault tolerance, no traffic is impaired after the deactivation of a connection but the new fault tolerance must first be re-established by corresponding adaptations of the admission control budgets in response to the deactivation.

In this respect, FIG. 3 diagrammatically shows the flowchart for the method sequence in the network control unit NCS for the planned and controlled deactivation of a network component, in this case connection L1. This method eliminates all previously mentioned disadvantages of the methods hitherto used.

In a first step S1, the connection L1 is determined as the network components to be deactivated. An operator signals this in the network control unit NCS via a user interface or via a protocol that he wishes to deactivate this connection L1. At the end of the first step S1, "L1" is therefore output as a result.

In the following second step S2, new optimized metrics MD are calculated in the network control unit NCS, for example by using network optimization methods, for a network in which the connection L1 to be deactivated is no longer contained. As a result, therefore, these new metrics "MD" are output.

In a third step S3, the network control unit NCS supplements the metrics MD by a very high metric value for the connection L1 to be deactivated and thus calculates a new resultant metric set M1 which is output as a result.

In the following fourth step S4, new admission control budgets B1 are calculated in the network control unit NCS with this new metric set M1 and are output as a result of this fourth step S4.

In a fifth step S5, the network control unit NCS checks a blocking probability BW to be expected for the network with the new metric set M1 and the new admission control budgets B1. As a result, this fifth step provides the information of a blocking probability BW.

In a sixth step S6, this blocking probability BW is then assessed. For this purpose, the determined value of the blocking probability BW is compared, for example, with threshold values for the highest blocking of a budget and/or for a mean blocking in the network. If this blocking probability BW is then too high, the functionality of the network control unit NCS contains, under menu guidance, the output of a note to the network operator that the planned deactivation of the connection L1 runs counter to the given budget policy and fault tolerance. In any case, the operator is requested to specify whether he would like to continue the deactivation method under the given circumstances or to abort it and then possibly recommence it with altered boundary conditions. In the case of abortion, a "NO" is output as a result and the deactivation method is terminated without the connection L1 actually having been deactivated. In the case where the operator would like to continue the deactivation method on the basis of a permissible metric set M1 and permissible budget B1, which results in a blocking probability lying below the defined limit value, this sixth step S6 delivers the result "YES".

In a seventh step S7, after this agreement of the operator with the deactivation of the connection L1, the connection L1 is then actually decommissioned in that the new metric set M1 configures for the network by means of the network control unit NCS. The connection L1 loses its traffic with the subsequent automatic rerouting. The network operator can then remove the connection L1 without any impairment of the traffic having occurred at any time.

Adapting the admission control budgets B1 before decommissioning the connection L1 ensures that any spontaneous failure of a further connection L2 in the network shortly after the decommissioning of the connection L1 does not lead to an impairment of the QoS of traffic already authorized. Due to the adaptation of the metrics for the connections, the traffic in the network is also distributed again as advantageously as possible at the same time as the connection L1 is decommissioned so that fewer bottlenecks can occur than if the decommissioning as such were not coupled to an adaption of the metrics MD.

With respect to this preferred procedure, there are a number of options and extensions:

a) After the adaptation of the admission control budgets B1, the network control unit NCS can wait until the traffic authorized at the admission control entities has decayed below the new values so that no traffic streams already authorized are interrupted. This procedure is advantageous particularly when the network operator uses an admission control method which does not provide any fault-tolerant budgets. If a budget is smaller than the sum of the traffic authorized on the corresponding link, no new reservations are authorized until sufficient reservations have terminated by themselves.

b) Instead of the comparison with threshold values for the blocking probability BW, the network control unit NCS can also output the corresponding raw data like, for example, the calculated blocking or calculated mean link utilizations.

c) The very high metric value used in the third step S3 can be the maximum permissible metric value for the respective routing protocol (e.g. 65535 with a 16-bit-long variable).

d) In the case where several connections are to be decommissioned at once, this can be implemented by serially processing the abovementioned steps S1 to S7. As an alternative, however, all connections to be deactivated can also be subject simultaneously to the method specified above. In such a case, L1 can designate, instead of the one connection in the above case, the set of connections to be deactivated.

e) Should it come to a loss of the connectivity of the network to individual network nodes after the actual deactivation of the connections (particularly in the case of option d), the network control unit NCS can output a separate warning to the network operator. This loss of connectivity cannot be detected by calculating the budgets and blocking probabilities on the basis of the new metric set M1 alone because a connection with maximum metric value would still be used because of the lack of alternative and would thus not remain free of traffic. A relevant check can then be performed on the basis of a virtual network graph which no longer contains the connections to be deactivated.

f) The removal of the connection L1, assumed in the second step S2, for calculating the optimized metrics for the remaining connections can be implemented by removing the connection from the network graph on the basis of which a metric optimizer operates in the network control unit NCS. As an alternative, the "clamping" of the metric of the connection L1 to the very high value can also be integrated directly in the metric optimizer. In the last-mentioned case, an additional check must be performed in the optimization of the metrics that the connection L1 is actually not used because an optimization of the metrics otherwise possibly leads to a metric set in which several connections are allocated the very high metric value because this would potentially provide for a better load distribution in the network which, however, would here have been completely "optimized past" the actual aim of the method, namely to render the connection to be deactivated free of traffic.

g) For the recommissioning of the connection L1, a procedure which is the approximate reverse of the abovementioned steps S1 to S7 can be selected. Firstly, the connection would then be physically reactivated, then new metrics and budgets would be calculated and when the network operator agrees, these metrics and budgets would be configured.

h) The commissioning of a completely new connection can also be carried out in accordance with the sequence provided in option g).

i) The present method can also be used for deactivating entire network nodes by proceeding, for example, in accordance with option d) and simply using the set of all connections connected to this network node as connection L1 to be deactivated. This procedure is particularly meaningful for pure transit nodes or for nodes to which only customers are connected who have other connections to other network nodes of the same network.

Naturally, other modifications and options are possible within the context of the present disclosure. In all solutions it is of importance that the traffic in the network is distributed as advantageously as possible due to the adaptation of the metrics for the connections with decommissioning of a connection and it is ensured that no traffic is handled on the connection to be deactivated. In the exemplary embodiment explained, this is particularly represented by steps S2 and S3. Step S4 is only required if the network is operated with admission control and the adaptation of the admission control budgets can then prevent that the QoS could no longer be guaranteed if a further connection L2 unexpectedly fails briefly after decommissioning of the connection L1.

The calculation of the blocking probability specified in step S5 can also be simplified to the extent that, for example, only the mean link utilization is determined and assessed.

The invention claimed is:

1. A method for deactivating a network component in a communication network having a number of network components, comprising:
   with a network control unit, identifying the network component to be deactivated;
   with the network control unit, calculating a new metric set for the remaining network components;
   with the network control unit, configuring the new metric set in the network and rerouting the network;
   with the network control unit, deactivating the network component to be deactivated; and
   with the network control unit, calculating new admission control budgets for the network based on the new metric set;
   wherein, in accordance with the new metric set and/or the new admission control budgets, the network control unit authorizes reservations for transmission capacity when a sum of the reservations has decayed to a value below a corresponding value in the new metric set and/or in the new admission control budgets.

2. The method as claimed in claim 1, further comprising:
   after performing the step of calculating the new metric set, the network control unit determines a traffic characteristic to be expected for the network with the new metric set and/or the new admission control budgets and compares the traffic characteristic to be expected with a predetermined limit value, and
   the network control unit, performs the step of configuring the new metric set when the value falls below the limit value.

3. The method as claimed in claim 2, wherein, when the limit value is exceeded, the network control unit issues a warning to the network operator.

4. The method as claimed in claim 3, wherein the network control unit supplements the new metric set with a metric value for the network component to be deactivated which handicaps the network component to be deactivated with respect to the remaining network components.

5. The method as claimed in claim 4, wherein, for the network component to be deactivated, the network control unit adds the metric value in the new metric set, and the metric value can be up to a maximum possible metric value.

6. The method as claimed in claim 5, wherein, the network control unit determines a failure probability to be expected and/or a blocking to be expected and/or a mean link utilization to be expected as a traffic characteristic.

7. The method as claimed in claim 1, wherein, in the deactivation of several network components, the identifying, calculating, configuring and deactivating are serially processed in the network control unit for one network component after another.

8. The method as claimed in claim 7, wherein, when the network control unit deactivates several network components, the network elements are accumulated to form a virtual network element.

9. The method as claimed in claim 1, wherein the network control unit checks the network for a loss of connectivity between two network components due to the planned deactivation of the network component connecting the two network components by using a virtual network graph which does not contain the network component to be deactivated.

\* \* \* \* \*